Aug. 14, 1962 H. HOLZRICHTER ETAL 3,048,930
DRYING OF WET POWDERY MATERIALS
Filed Oct. 22, 1957
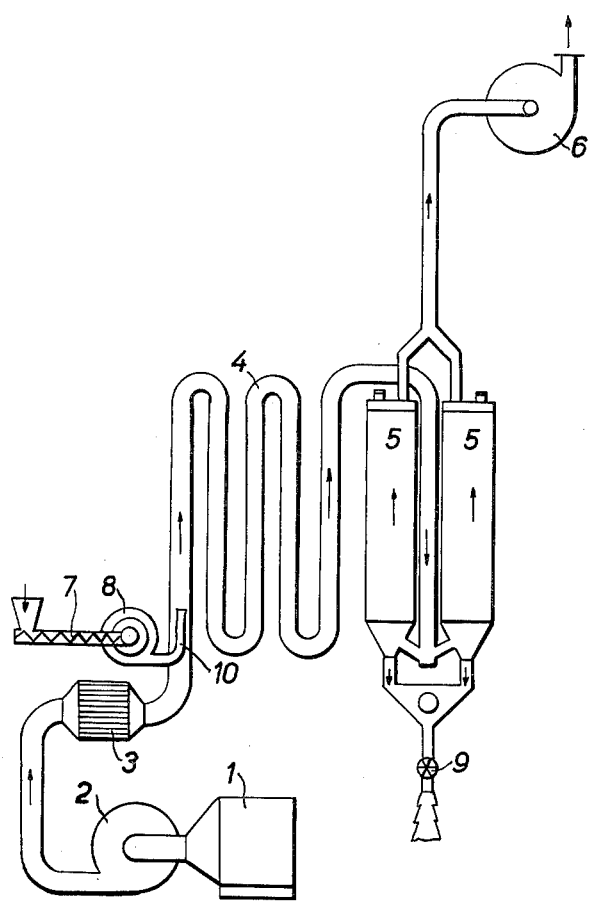
INVENTORS:
HERMANN HOLZRICHTER, KURT FALK, THEODOR KÖNIG.
BY
their ATTORNEYS

United States Patent Office 3,048,930
Patented Aug. 14, 1962

3,048,930
DRYING OF WET POWDERY MATERIALS
Hermann Holzrichter, Kurt Falk, and Theodor König, Leverkusen-Bayerwerk, Germany, assignors to Farbenfabriken Bayer Aktiengesellschaft, Leverkusen, Germany, a corporation of Germany
Filed Oct. 22, 1957, Ser. No. 691,628
Claims priority, application Germany Oct. 26, 1956
8 Claims. (Cl. 34—10)

The present invention relates to a process and apparatus for drying wet powdery materials.

In the working up of sensitive powdery materials, especially organic substances such as plastics which are obtained by polymerization or copolymerization in aqueous medium, the removal of the water inherent in said materials presents considerable difficulties. It is for this purpose necessary to subject the plastics or other organic substances to drying conditions which are such that their chemical and physical properties are not changed. This problem could not hitherto be satisfactorily solved, since the plastics very readily become discolored or even partially carbonized when using the usual drying methods. This applies especially as regards plastics which contain reactive groups, especially groups sensitive to oxygen, such as for example nitrile groups, aldehyde groups, carboxyl groups, ester groups or groups with carbon-to-carbon double bonds. Furthermore, a requirement of the drying methods for the said platsics is that they enable the said plastics to be dried in the shortest possible time, since the economy of such processes is otherwise jeopardized.

The drying of plastics in powder form and containing water has hitherto been effected on disked members or plates or in tubes at temperatures higher than 50° C., and the material being dried has also if necessary been subjected to movement. When the plastics are those having groups sensitive to oxygen, the material being dried always showed a considerable discoloration. For example, if polyacrylonitrile or a co-polymer which, in addition to having preponderant quantities of acrylonitrile, also contains other monomers incorporated therein by polymerization, is dried in a vacuum drying chamber at 60° C. at a vacuum of 10 mm. to a moisture content of 0.2–0.4%, a typical grey coloration is found on the surface of the plastics and, when these are spun, this coloration results in the color of the spun material being deleteriously affected. Furthermore, if polymers or copolymers of butadiene are treated in the drying arrangements referred to, the dried material shows a more or less strong yellowing, whereby the market value of the product is considerably reduced. The same difficulties arise when a synthetic elastomer which contains for example a co-polymer of butadiene and acrylonitrile and/or styrene is dried in a tubular vane-type drier at 80° C. at a reduced pressure of 40 mm. In this case, only a product which is yellowish in color and which is not suitable for processing into pure white or ivory moulded elements is obtained.

Moreover, a disadvantage inherent in these processes is that the drying takes too long, with the result that chemical changes occur in these parts of the molecules which are sensitive to reaction.

It has now been found that these disadvantages can be avoided if materials in powder form and containing water, more especially plastics containing reactive groups, which are obtained by polymerization of copolymerization in aqueous media are continuously blown by means of an air stream into a tube system charged with a stream of hot air so that the material is whirled and entrained by the streams of air. A conventional filter plant can be arranged at the end of the tube system to collect the dried material.

It has furthermore been found that the mode of introducing the powdery material into the hot air stream is of considerable importance for a satisfactory working of the drying system. The air stream by which the wet powdery material is introduced into the hot air stream is led in such a way that the former has the same direction as and is surrounded by the hot air stream when both air streams are brought in contact with each other. Furthermore, it has been found advantageous to give these air streams nearly the same speeds at the place where both air streams are contacted with each other.

The temperature of the current of hot air at the inlet end can fluctuate within wide limits. Temperataures which are preferred are those from about 40–250° C., preferably 70–200° C. The temperature of the air by which the powdery material is blown into the hot air stream is preferably 20° C. lower than the temperature of the hot air at the inlet but not higher than 100° C., preferably at 5°–60° C., more especially at 5°–40° C. At the outlet end the temperature of the air may vary between about 20–180° C., preferably 50°–100° C. The quantity of air is adapted to the tube system used in such manner that all the material to be dried is entrained by the current of air. Air velocities of about 0.5–30 m./sec., preferably 5–20 m./sec. at the place where both air streams meet, have proved to be particularly suitable.

In order to obtain effective drying, it is advisable to use the powdery material, especially the platsic powder in a grain size of about 2–80$\mu$. The water content of the material being dried can be up to approximately 80% by weight. By using the present process, it is readily possible to effect a drying of the powder down to a water content of less than 1% by weight. The material to be dried can be introduced into the air stream by which it is blown into the hot air stream by means of continuously operating devices, such as for example by means of a worm. In those cases where the materials to be dried are not of the necessary fine grain size, it can be advisable for said material to be subjected to mechanical comminution before being introduced into the current of hot air. The "Sux" mill of Alpine AG, for example, has proved suitable for this purpose. Instead of the "Sux" mill there may be used any other mill which is provided with fans which draw air through the mill.

It has been found that, particularly gentle and rapid drying of the material is obtained with this form of the process, the drying process for a single particle taking no longer than a few seconds, no baking of the powdery material at the walls of the tube system taking place.

Oxygen-sensitive polymers and copolymers or polymer mixtures such as are obtained by the process of dispersion or emulsion polymerization are more especially suitable for carrying the process into effect. The dispersion polymers are preferably separated by conventional filtering means from the polymerization bath, then washed and largely freed from the inherent water by conventional filtration methods. These products can then in most cases be directly subjected to the drying process according to the application without previous comminution. The latices produced in the emulsion polymerization are coagulated in the usual manner, for which purpose a common salt solution is generally employed. Since in this case the products forming often have an unsuitable grain composition, it is advisable for the coagulated bath to be brought to an elevated temperature, such as for example 50–100° C. for some hours prior to being filtered off. It was surprisingly established that, when working in this way, a product is obtained which is particularly adapted to drying by the present drying process, especially when it is previously subjected to a mechanical comminution in a mill after filtration.

The drying process according to the invention is of particular importance for drying mixtures of thermoplastic polymers or copolymers such as styrene-acrylonitrile copolymers, and elastomeric copolymers of butadiene and acrylonitrile and/or styrene, which are used for the manufacture of articles with high unnotched and notched impact strengths. Such mixtures are for example described in U.S. specifications 2,439,202; 2,498,652; 2,505,349; 2,550,139; 2,597,951; 2,600,024.

Furthermore, copolymers of butadiene and acrylonitrile may be used as elastomeric components for said mixtures, these copolymers additionally containing monomers with self-cross-linking groups incorporated therein by polymerisation. Under self-cross-linking groups we understand such groups which effect cross-linkage of the copolymers when heating the latter to temperatures of about 100–220° C. Such groups are for instance carbonyl groups, such as carboxyl, carbonamide, aldehyde groups, keto groups, furthermore methylol groups, methylolether groups, dioxolane groups, ureido groups and groups of the formula:

$$\begin{array}{c} \diagdown \phantom{C}_{\diagup}^{COR_4} \\ C \\ \diagup \phantom{C}^{\diagdown}_{COR_5} \end{array}$$

in which $R_4$ and $R_5$ stand for a hydrocarbon residue, which may be bond to the carbonyl groups by way of an oxygen atom.

For producing said co-polymers butadiene and acrylonitrile may be copolymerized with monomers containing said groups. Such monomers are for instance:

(1) Ethylenically unsaturated carboxylic acids, such as acrylic acid, α-chloromethacrylic acid, methacrylic acid, crotonic acid, sorbinic acid, cinnamic acid, maleic acid, maleic acid mono-alkylester.

(2) Amides of ethylenically unsaturated carboxylic acids, such as acrylamide, methacrylamide.

(3) Ethylenically unsaturated aldehydes, such as acroleine, methacroleine.

(4) Copolymerizable ethylenically unsaturated monomers containing at least one methylol or methylolether group preferably of the formula:

$$-OC-\underset{\underset{R_1}{|}}{N}-CH_2OR$$

in which R stands for hydrogen or alkyl, such as methyl, ethyl, propyl, isopropyl, butyl, isobutyl, hexyl, and $R_1$ for hydrogen, alkyl, aryl. Such monomers are for instance the alkylether of the methylol derivatives of acrylamide (compare Belgian Patent 539,963).

(5) Copolymerizable ethylenically unsaturated monomers containing at least one dioxolane residue in the molecule, as for instance compounds of the formula:

$$\begin{array}{c} CH_2=\underset{\underset{R}{|}}{C}-COO.CH_2.\underset{}{CH}\!\!-\!\!-\!\!-\!\!CH_2 \\ \phantom{xxxxxxxxxxxxxxxxx} | \phantom{xx} | \\ \phantom{xxxxxxxxxxxxxxxxx} O \phantom{xx} O \\ \phantom{xxxxxxxxxxxxxxxxxx} \diagdown_{\phantom{x}C\phantom{x}}\diagup \\ \phantom{xxxxxxxxxxxxxxxx} \diagup \phantom{xx} \diagdown \\ \phantom{xxxxxxxxxxxxxxx} R_1 \phantom{xxx} R_2 \end{array}$$

in which A stands for hydrogen or alkyl, $R_1$ and $R_2$ for hydrogen or a hydrocarbon residue, such as alkyl, cycloalkyl, aryl. Suitable compounds of this type are for instance isopropylidene-glyceryl, acrylate, and methacrylate, methyleneglyceryl acrylate and methacrylate (compare U.S. Patent 2,680,735).

(6) Copolymerizable ethylenically unsaturated monomers containing at least one ureido radical of the formula:

$$-NR_2-CO-NHR_2$$

in which $R_2$ stands for H or a hydrocarbon residue.

Suitable compounds of this type correspond for instance to the following formulae:

(a) $\quad CH_2=C(R).COO-A-NH.CO.NH_2$ in which R stands for H or alkyl and A for an alkylene group, such as ethylene, propylene, isopropylene. Such compounds are for instance: β-ureidoethyl methacrylate and acrylate (compare U.S. Patent 2,694,695).

(b) $\quad CH_2=CH-O-A-NR_3-CO.NHR_3$ in which A stands for a cycloalkylene groups or for an alkylene group with 2–18 carbon atoms, and $R_3$ for hydrogen or a monovalent aliphatic or cycloaliphatic radical with 1–24 carbon atoms. Such compounds are disclosed in French Patent 1,075,898 and in U.S. Patent 2,734,891. By way of example there may be cited: Ureidoethylvinyl ether, 3-ureidopropylvinyl ether, β-ureidoisobutylvinyl ether, N-cyclohexylureidoethylvinyl ether, N-(2-vinyloxyethyl)-N'-ethylurea.

(7) Monomers of the formula:

$$\begin{array}{c} \phantom{xxxx}_{\diagup}^{COR_4} \\ CH_2=C \\ \phantom{xxxx}^{\diagdown}_{COR_5} \end{array}$$

in which $R_4$ and $R_5$ stand for a hydrocarbon radical, which can be bound to the carbonyl group by way of an oxygen atom. Such compounds are for instance the methylene derivatives of malonic acid esters, acylacetic esters, such as acetoacetic acid ethylester, acylacetones, such as acetylacetone. These compounds may be obtained by heating compounds of the general formula:

$$\begin{array}{c} \phantom{xxxx}_{\diagup}^{COR_3} \\ H_2C \\ \phantom{xxxx}^{\diagdown}_{COR_4} \end{array}$$

in which $R_3$ and $R_4$ have the above meaning with paraformaldehyde in the presence of catalytic amounts of Fuller's earth, whereafter the water present in the reaction mixture is distilled off aceotropically and the residue is worked up in known manner.

The elastic copolymers used for the production of the blends of the present invention are preferably composed of 5–45 percent by weight of bound acrylonitrile, about 0.1 to 20 percent by weight of bound monomers with self-cross-linking groups, the rest being bound butadiene. Copolymers of this type can be readily converted into an insoluble gel by heating them for a short period of time to temperatures ranging from about 140–170° C.

The elastic copolymers are preferably produced by the process of emulsion polymerization according to known methods in an aqueous medium in the presence of catalysts, emulsifying agents and modifiers. Instead of butadiene there may be used homologues or derivatives of butadiene, such as isoprene. Moreover, it is possible to replace part of the mentioned monomers of other ethylenically unsaturated monomers, such as vinylchloride.

As pointed out above the elastic copolymers contain about 0.1–20 percent by weight of bound monomers with self-cross-linking groups. The preferred range is about 1–10 percent by weight. In addition monomers which act as cross-linking agents when they are copolymerized with other monomers, such as divinylbenzene, glycoldiacrylate, may be used as copolymerizing components in the production of the elastic copolymers. Generally speaking, these monomers have no essential effect on the physical characteristics of the present blends.

These blends are preferably composed of about 10–75 parts by weight of the aforementioned elastic copolymers and of about 90–25 parts by weight of a thermoplastic copolymer, preferably of a copolymer of acrylonitrile and styrene containing 5–45 parts by weight of bound acrylonitrile.

These thermoplastic copolymers may be produced by the emulsion polymerization procedure as disclosed for instance in U.S. Patent No. 2,140,048 in an aqueous medium in the presence of an emulsifying agent, a polymerization catalyst and a modifier.

The styrene in the above copolymers may be replaced at least partially by styrene derivatives, such as α-chlorostyrene, 4-chlorostyrene, 2,4-dichlorostyrene. Furthermore, the above thermoplastic styrene-acrylonitrile copolymers may be replaced wholly or partially by other thermoplastic polymers, such as polyvinyl-chloride and copolymers of a major proportion of vinyl chloride with a minor proportion of another copolymerizable monomer as for instance vinylidenechloride, vinylacetate.

The blending of the elastic and of the thermoplastic copolymers is preferably carried out by mixing the latices of said copolymers as they are obtained by emulsion polymerization. These mixtures are then subjected to coagulation by well known methods. Since these mixtures are particularly sensitive to heat owing to the presence of carbon-to-carbon double bonds, and nitrile, carbonyl or spontaneously cross-linking groups, it has not so far been possible to dry these satisfactorily on a technical scale. These difficulties are however completely avoided by means of the present process.

Moreover, the drying of acrylonitrile polymers or copolymers of acrylonitrile with about 1–20% of other monomers, such as are used for the production of textile products, can be effected satisfactorily by the process of the invention.

Furthermore, there may also be mentioned in this connection the graft polymers of butadienes, acrylonitrile and styrene which are used for the production of moulded elements with a high notch impact strength, which polymers can also be dried without any difficulty by this process in spite of their high sensitivity to oxygen. (Compare British specifications 754,722, 744,455, and U.S. specifications 2,802,808, 2,802,809.)

In some cases, it has also proved advantageous to add steam or inert gases, such for example as nitrogen or carbon dioxide, preferably in amounts of about 0.1 to 50% to the stream of air. Products having particularly high purity of color can be produced in this way.

The process of the present invention is illustrated in the flow sheet of the accompanying drawing. The drying system comprises an air filter 1 and a fan 2 through which the air is pressed into the tube system 4, after having passed the heater 3. The powdery plastic material is introduced by means of the screw conveyor 7 and the air stream of the "Sux" mill 8 through the tubular member 10 which at its free end may be provided with a conically widened outlet into the stream of hot air. The hot air is sucked off by means of the fan 6 through the bag filter 5, the drying material being drawn off through the outlet 9.

*Example*

1000 parts of the 30% latex of a copolymer obtained by emulsion polymerization from butadiene with 35% by weight of acrylonitrile, 0.5% by weight of divinyl benzene and 1.5% by weight of methacrylic acid are mixed with 2058 parts of the 34% latex of a copolymer produced in aqueous emulsion from styrene with 25.2% by weight of acrylonitrile, so that there are 300 parts of the elastic components to 700 parts of the thermoplastic copolymer. After adding an aqueous dispersion prepared by means of emulsifiers from 50 parts of titanium dioxide, the mixture of the latices is coagulated by using a 25% common salt (sodium chloride) solution.

Since this coagulate is difficult to work up (wash and dry) because of its extremely fine grain size, the suspension in water is slowly heated while stirring to 80° C. As a result, the ultra-fine material agglomerates to form a granular product which can be washed on a rotary filter and can satisfactorily be hydro-extracted on a centrifuge, so that a moist material with 50% of water is obtained. It is now readily possible to dry this 50% material in a hot air drier of the type disclosed above and illustrated in the accompanying drawing.

This consists of a tube system comprising 5 vertically arranged and interconnected tubes with a diameter of about 300 mm. and each with a length of about 10,000 mm. Hot air heated to 140° C. is blown at a rate of about 3,200 cubic metres per hour through this tube system by means of a fan.

Before being introduced into this hot air drier, the moist material is mechanically comminuted by means of a "Sux" mill (a special type of a hammer mill being provided with a fan to blow air through the mill). The introduction of the ground material into the hot air drier is effected by means of the stream of cold air (about 20° C.) produced by the "Sux" mill; the amount of this cold air being about 800 cubic metres per hour. The tubular member (designated by 10 in the accompanying drawing) has a diameter of about 100 mm. and of about 140 mm. at its free end, the angle of the conically shaped walls of the outer end of said tube being about 8°. By this means, it is possible to surround the cold air stream concentrically with a stream of hot air, whereby any baking of the powder on the walls of the tube system is prevented. At the end of the tube system the combined air streams have a temperature of about 50° C. After leaving the tube system, the combined air streams reach a bag filter, in which the dry powder is deposited in the filter bags. The air is extracted by a fan arranged behind the filter. About 60 kg. of the dry product may be produced per hour. A pure white product is obtained having a water content of about 0.3–0.5%.

Instead of air also other gases, such as flue or combustion gases may be used in carrying out the present drying process. These gases may be used for introducing the powdery material into the drying system as heated gas streams into which the powdery materials are blown or for both purposes.

What we claim is:

1. A process of drying powdery synthetic polymers containing water which comprises introducing said polymer by means of an air stream into a cylindrical stream of hot air externally confined by the walls of a tube of constant diameter in such a manner that both streams flow concurrently and have substantially the same speed when they join, and the air stream carrying the powdery polymers is surrounded by the cylindrical stream of hot air, whereby the powdery polymers are entrained by the combined cylindrical air stream, keeping the powdery polymers in the combined air stream until the water has been substantially evaporated, and thereafter removing the powdery polymers from the combined air stream, said cylindrical stream of hot air having a temperature of from 40 to 200° C. at the beginning of the drying process, said polymer-entraining air stream having a temperature of about 5 to 60° C. at the point where it joins said cylindrical stream of hot air, said combined streams at the end of the drying process having a temperature of about 20 to 100° C., said synthetic polymer containing reactive groups selected from the class consisting of olefinically unsaturated groups, nitrile, carboxyl, carbonamide, aldehyde, keto, methylol, methylol ether, dioxolane, and ureido groups.

2. Process according to claim 1 wherein said synthetic polymer is comminuted in a mill provided with a fan, and thereafter is introduced into said cylindrical stream of hot air by means of said fan.

3. Process according to claim 1 wherein said synthetic polymer is one which has been prepared by polymerization of the monomers in an aqueous medium and mechanical separation of said aqueous medium from said polymer, said polymer being capable of drying without comminution.

4. Process according to claim 1 wherein said synthetic polymer is a mixture of a thermoplastic copolymer of styrene and acrylonitrile and of an elastomeric copolymer selected from the group consisting of elastomeric copolymers of butadiene and acrylonitrile, and elastomeric copolymers of butadiene and styrene.

5. Process according to claim 1 wherein said synthetic polymer is a polymer blend obtained by mixing aqueous latices of a thermoplastic copolymer on the one hand and an elastomeric copolymer containing olefinically unsaturated groups on the other hand, followed by coagulation of the mixed latices.

6. Process according to claim 1 wherein said synthetic polymer is a graft polymer produced from an aliphatic conjugated diene having 4 to 6 carbon atoms, acrylonitrile and styrene.

7. Process of claim 1 wherein said synthetic polymer is an elastomeric copolymer of butadiene, acrylonitrile, and an olefinically unsaturated monomer containing a reactive group selected from the group consisting of carboxyl, carbonamide, aldehyde, keto, methylol, methylol ether, dioxolane, and ureido groups.

8. Process of claim 7 wherein said elastomeric copolymer is mixed with a styrene-acrylonitrile copolymer.

References Cited in the file of this patent

UNITED STATES PATENTS

| | | |
|---|---|---|
| 999,972 | Ekenberg | Aug. 8, 1911 |
| 1,157,947 | Merrell | Oct. 28, 1915 |
| 1,423,928 | Field | July 25, 1922 |
| 1,667,666 | Koon | Apr. 24, 1928 |
| 2,009,531 | Stam | July 30, 1935 |
| 2,054,441 | Peebles | Sept. 15, 1936 |
| 2,106,869 | Falkenstein et al. | Feb. 1, 1938 |
| 2,119,932 | Stam | June 7, 1938 |
| 2,435,927 | Manning et al. | Feb. 10, 1948 |
| 2,561,394 | Marshall | July 24, 1951 |
| 2,585,967 | Schibler | Feb. 19, 1952 |
| 2,614,089 | Harrison | Oct. 14, 1952 |
| 2,614,093 | Wheelock | Oct. 14, 1952 |
| 2,800,463 | Morrison | July 23, 1957 |